July 26, 1960 W. A. BERBERICH 2,946,397
LADDER MOUNT FOR VEHICLES
Filed Feb. 6, 1958 3 Sheets-Sheet 1
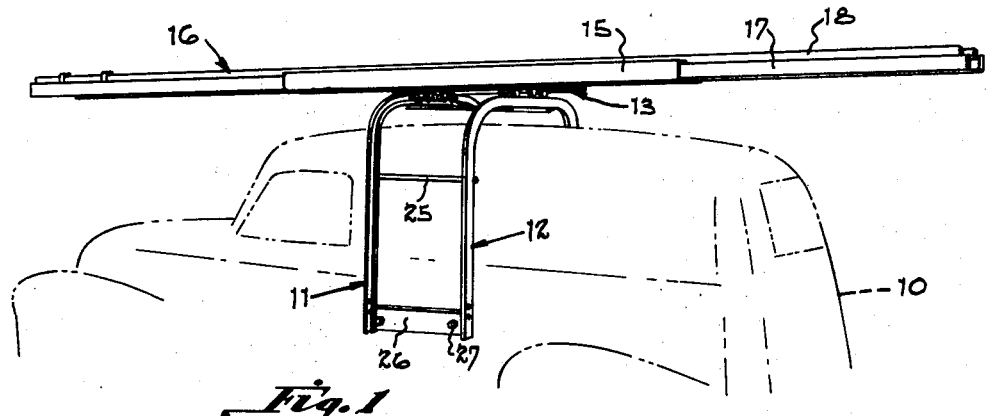
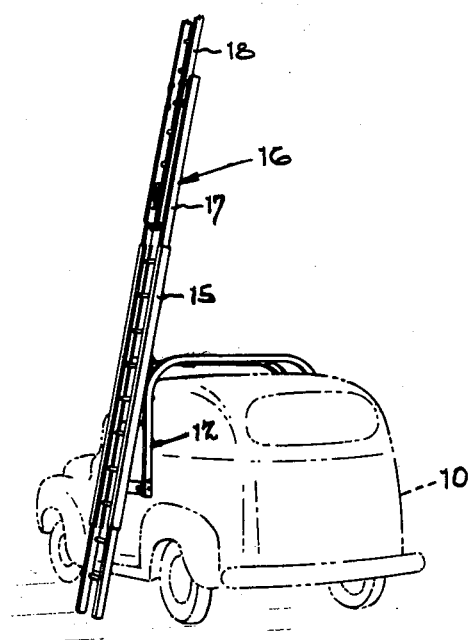
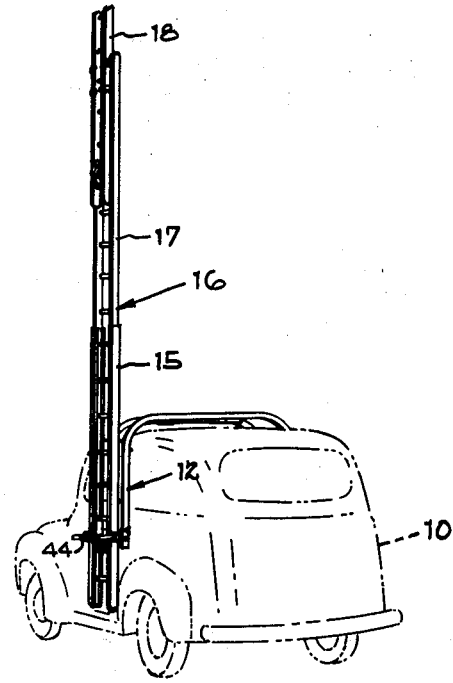
INVENTOR.
Wilfred A. Berberich.
BY
Wood, Herron & Evans.
ATTORNEYS.

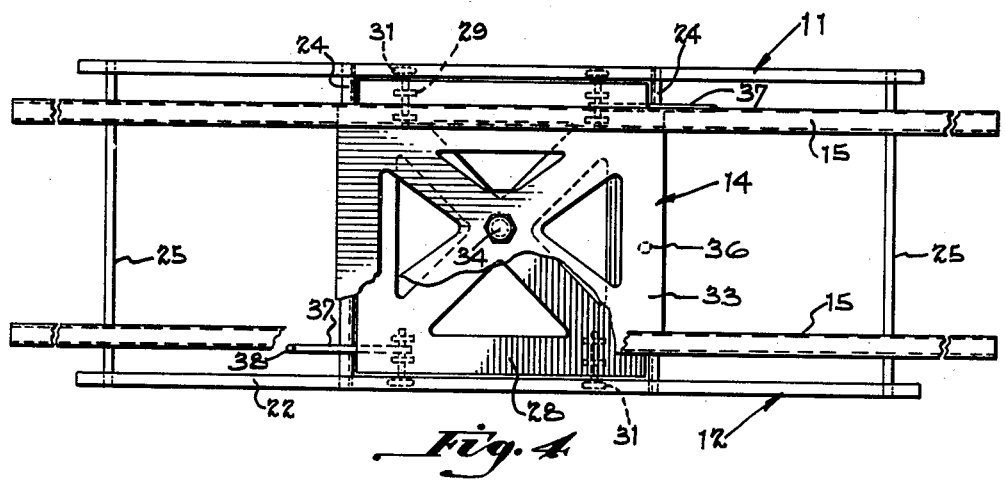
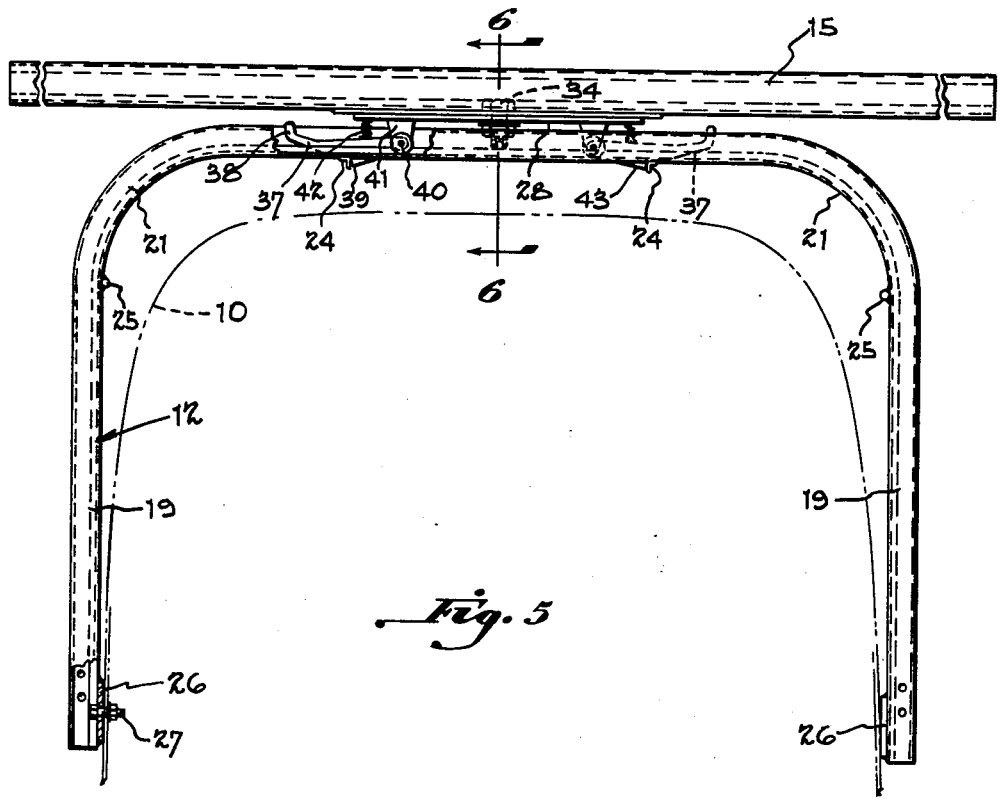

July 26, 1960  W. A. BERBERICH  2,946,397
LADDER MOUNT FOR VEHICLES
Filed Feb. 6, 1958  3 Sheets-Sheet 3

INVENTOR.
Wilfred A. Berberich.
BY
Wood, Herron & Evans.
ATTORNEYS.

United States Patent Office 2,946,397
Patented July 26, 1960

2,946,397

LADDER MOUNT FOR VEHICLES

Wilfred A. Berberich, 622 W. 11th St., Covington, Ky.

Filed Feb. 6, 1958, Ser. No. 713,712

8 Claims. (Cl. 182—39)

This invention is directed to means for mounting a pair of conventional extension ladders upon a vehicle, such as a light duty truck, to convert the vehicle into an aerial ladder truck.

One of the objectives of the invention is to provide an inexpensive mount of the type set forth which can be used by workmen, such as electricians, painters, maintenance men and others, to reach overhead objects, such as lights, signs, etc., which otherwise would be inaccessible either because the objects are too high to be reached safely on an unsupported extension ladder, or because the objects are such that the upper end of an extension ladder cannot be rested against them. The ladder mount of this invention, thus, makes it possible for a man, such as an electrician who is in business for himself, to do work which he could not otherwise do, unless he were to purchase a costly aerial ladder truck.

Another object of the invention is to provide a mount of the type set forth which can be operated easily and with complete safety by one man.

Another object is to provide a mount of the type set forth which, in addition to its use as a support for an elevated extension ladder, serves as a conventional ladder rack for transporting ladders from place to place. That is, the mount of this invention has the very practical advantage that the ladders may be removed quickly and easily so that they can be used in the conventional manner away from the truck.

Another objective of the invention is to provide a mount of the type set forth which permits the extension ladder to be adjusted at various angles for reaching overhead objects which are so placed that the truck upon which the ladder is mounted cannot be parked directly under them.

Another object is to provide a mount having few parts which may be fabricated and assembled inexpensively. In the fulfillment of this objective and others the inventor provides a pair of rails which in the preferred embodiment are in the shape of an inverted U. These rails provide a track assembly which may be mounted straddlewise over a vehicle. The track assembly mounts a carriage which is movable along both of the vertical runs and the horizontal run of the U-shaped track. The extension ladders are received in brackets which are secured to a turntable mounted on the carriage. Thus, the turntable may be swivelled relative to the carriage with the carriage in any position upon the tracks and in this way the angularity of the ladders may be adjusted within wide limits. Preferably, the turntable is locked relative to the carriage and the carriage locked upon the track assembly for transportation with the ladders extending lengthwise of the top of the vehicle. When thus locked, the mount serves the same function of a conventional ladder rack and in no way interferes with the removal of the ladder so that they can be taken from the truck for use in the conventional manner. If desired, the track assembly may be in the shape of an inverted L instead of the U. However, this limits somewhat the utility of the assembly, because it provides only one vertical run at one side of the truck. In addition, the ladders may be carried at one side of the truck by moving the carriage onto a vertical run of the track assembly and locking the carriage to the track assembly in this position with the ladders horizontal.

In operation, the ladders are first swung so that they extend across the vehicle body and then the carriage is moved to one side of the track assembly to bring the bottom of the lower ladder of the extension set into contact with the ground at one side of the truck. However, if the ground is uneven or if for any other reason the ladder cannot be supported from the ground, means are provided to support the ladder directly upon the truck and the support is arranged so that ladders may be angulated with respect to the vertical as desired to do a particular job.

Other objects and advantages of the invention will be readily apparent to those skilled in the art from the following description of the drawings in which:

Figure 1 is a perspective view showing an assembly constructed in accordance with the invention mounted upon a panel truck, the truck being shown in phantom lines only. In this view the extension ladders are shown in position for transportation from place to place.

Figure 2 is a perspective view showing the ladders in raised position with the bottom ladder resting upon the ground at one side of the truck.

Figure 3 is a view similar to Figure 2 showing the bottom ladder supported upon the truck.

Figure 4 is a top plan view of the assembly with parts being broken away to illustrate details of construction.

Figure 5 is a side elevational view of the assembly shown in Figure 4.

Figure 6:
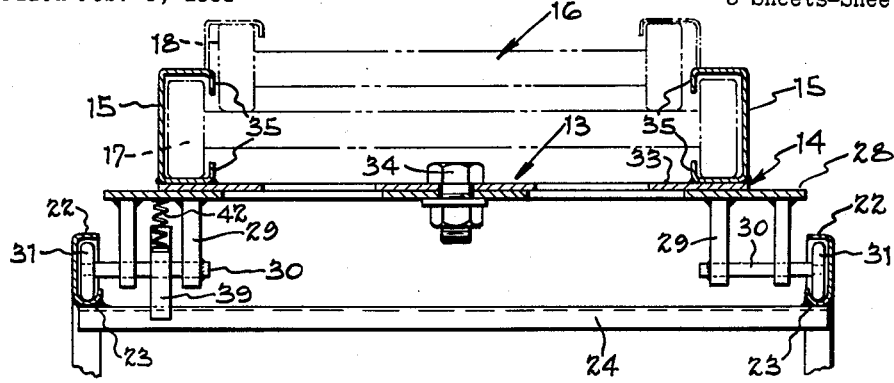
Figure 6 is a fragmentary cross sectional view taken on the line 6—6 of Figure 5.

The numeral 10 designates a panel truck, which is representative of a number of different types of trucks and other vehicles upon which the apparatus of this invention may be mounted. It will be apparent that the apparatus is equally well adapted for use upon a truck having a pick-up body, or a utility body, or a van body, and that it may be mounted upon a conventional automobile body, such as a sedan, if desired. In general, the apparatus comprises a pair of rails or tracks, designated 11 and 12 respectively, a carriage 13 which is mounted for movement along the rails 11 and 12, and a turntable 14 to which is secured ladder brackets, such as those indicated at 15—15, which are designed to receive a set or pair of ordinary extension ladders 16. The ladders may be made of wood, Fiberglas, aluminum or magnesium, the material and design of the ladders having no direct bearing upon the invention other than dictating the specific shapes of the brackets which receive them. In the instance shown, the ladders include a lower ladder 17 and an upper ladder 18. Following conventional practice the upper ladder is narrower than the lower ladder and means are provided to hold the upper ladder in an extended position with respect to the lower one. Additionally, means are provided to maintain the two ladders in telescoping relation.

The rails 11 and 12, in each instance, comprise a channel which is bent into an inverted U configuration providing two vertical runs 19—19 and a horizontal run 20.

Where the vertical runs meet the horizontal run it is preferred that the rails be bent on a substantially large radius as shown at 21. The two rails are mounted in spaced parallel relation with the open faces of the two channels toward one another as shown in Figure 6. It is preferred, as shown, that the flange 22 of each channel, which is uppermost on the horizontal run and which is outermost on the two vertical runs, be substantially flat and that the opposite flange, designated 23, be curved inwardly for reasons to be explained. However, the particular configuration shown is not critical.

Figure 9:
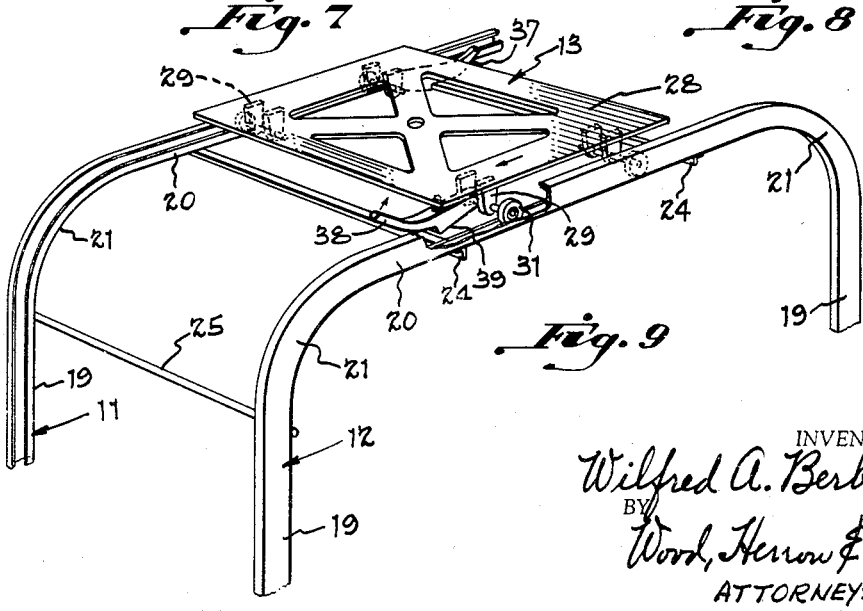
Figure 9 is a fragmentary perspective view of the assembly with parts removed and broken away to illustrate details of construction.

The two rails are joined together in their horizontal runs by two angle bars 24—24, which are spaced equally on opposite sides, from the center of the assembly, as best shown in Figure 9. The vertical runs of the two tracks are secured together adjacent to the curves 21 at each side by means of tie bars 25—25 and they are secured together adjacent to the lower ends at each side by means of plates 26—26. It is preferred that the plates, the tie bars and the angle bars be welded to the rails to provide a rigid track structure. The two plates 26—26 provide a means for securing the track assembly onto a truck body, such as the panel truck shown, with the rails straddling the truck body and with the two plates 26—26 resting against the opposite sides of the body. Bolts such as 27—27 pass through appropriate bores in the plates and in the sides of the body to secure the track assembly in place. If the metal of the truck body is thin it may be reinforced by means such as sheets of metal in the places where the bolts are located. If desired the two rails may be made to telescope in their horizontal runs to accommodate the assembly to bodies of different widths.

The carriage shown is made from a rectangular steel plate 28 in which four triangular-shaped openings are cut to lighten the assembly. It will be apparent, however, that the plate or body of the carriage may be made following other, known techniques, such as by casting, if desired. As shown, the plate or body 28 of the carriage has four sets of journal brackets 29, provided in pairs, which are welded to the underside of the plate 28 adjacent to the four corners. These journal brackets each mount a stub shaft 30, the shaft in each case having a roller 31 at its outer end which is engaged in a track. These rollers, preferably, are inserted into the rails from one end, the curved flanges 23 of the channel-shaped rails preventing the rollers from becoming disengaged once they are in place. The carriage may be prevented from coming out of the rails by means such as wing bolts 32—32 which are threaded through the rails adjacent to their lower ends. These bolts may best be seen in Figure 7. It will be obvious that other stop means may be provided if desired in order to limit the carriage movement.

Turntable 14 may be made from a plate 33 similar to plate 28 which forms the body of the carriage. This plate also may be lightened, as shown, by cutting triangularly shaped openings in it. In addition, this plate may be fabricated following other, known techniques, such as by casting, if desired. The turntable and the carriage have mating bores at their centers which receive a large bolt 34, this bolt constituting a pivot for the turntable so that it may be turned relative to the carriage. Other means may be provided if desired to join the turntable to the carriage. In addition, anti-friction means may be interposed between the two plates 28 and 33.

Each of the two ladder brackets 15—15 which, together with the plate 33 of the turntable, constitute a rack for the ladders, may be fabricated from an elongated channel member which is welded in place along one side and on top of the turntable with the open side of the channel facing the pivot. It is preferred that the open side of each channel include two flanges 35—35, which are turned up and down respectively, to partially enclose the uprights of a ladder inserted lengthwise into the rack.

Means such as a lock pin 36 is employed to prevent relative turning movement between the ladder rack and the carriage when desired. The lock pin traverses a pair of holes which are aligned when the rack and the carriage are oriented such that the ladders extend longitudinally of the truck body upon which the apparatus is mounted. In addition, the carriage may be locked in a centered position on the horizontal runs of the two tracks by means such as dogs 37—37 best shown in Figure 5. In each instance, a dog consists of a handle 38, a latch 39 and a pivot 40. The pivot may consist of a pin which traverses a bracket 41 fastened to the underside of the carriage by means such as welding. Each dog is biased by means of a coil spring 42 which is seated between the dog and the carriage. Two dogs are provided, being located diagonally opposite one another at the sides of the carriage. The two angle bars 24—24 are so located with respect to the dogs that the latches 39 engage the inner faces of these bars when the carriage is centered on the horizontal runs of the tracks. If it is desired to move the carriage to the left as shown in Figure 5, only the dog at the left need be lifted. In moving the carriage to the left the undersurface 43 of the other dog merely cams over the left one of the two angle bars 24.

In the use of the assembly the ladders are disposed, as shown in Figure 1, for transportation, the ladders being nested and fastened by any known means within the brackets 15—15. If desired, the front end of the set of ladders may be hooked or tied by rope to the front bumper of the vehicle. It is preferred however, that means such as a lock pin, which may be the one shown at 36, is provided having a hooked upper end which engages over the rungs of the ladder. This lock pin can be threaded if desired to receive a nut at the underside of the carriage to prevent its inadvertent removal.

In order to raise the ladders into an elevated position the lock pin 36 is first removed and then the carriage is swivelled so that the ladders extend across the top of the truck. At this time the dog at the side of the truck toward which the ladders are to be moved may be released and then the carriage rolled across the horizontal run and around the curves 21 to bring the lower ladder into a position on the ground as best shown in Figure 2. The upper ladder then may be extended. In order to prevent the extended ladder from tipping, the lower ladder may be lashed to the side of the truck. In cases where the truck is parked upon a hill only one leg of the ladder may contact the ground, but this one contact, coupled with the support offered by brackets 15—15 is found to be adequate to keep the ladders straight. If desired, means such as a crank, drum and cable unit may be incorporated in the set of ladders such that the upper one, or upper two, if a triple set of ladders is used, may be elevated from the ground mechanically.

Means are also provided for locking the ladders in an elevated position while supported on the truck. For this purpose, a set of bars 44—44 is provided adjacent to the lower ends of the rails at each side of the assembly. It is preferred that these bars be hinged, as shown at 45 in Figure 8, so that they may be swung in against the side of the truck body when they are not in use. The bars of each set receive a pair of brackets 46 which slide on the bars. These brackets are fastened to the ends of a cross bar 47 and the cross bar mounts a series of hooks 48, which is designed to receive the lowermost one of the rungs of the lower ladder. In the instance shown, three such hooks are provided and they are tied together by a strap 49 which is welded to them. The hooks hold the ladder up and the cross bar prevents tilting. In this way the ladders are rigidly held in place and they may be extended to their limit and the weight of a workman safely supported.

Figures 7, 8:
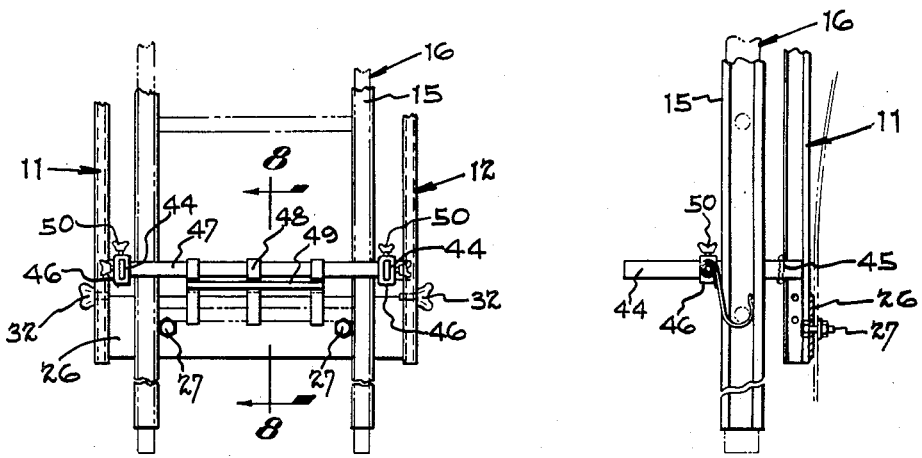
Figure 7 is a fragmentary side elevational view illustrating a preferred means of supporting the ladders in elevated position on the truck.
Figure 8 is a fragmentary cross sectional view taken on the line 8—8 of Figure 7.

The sets of bars 44 provide a convenient means of adjusting the angulation of the elevated ladders and thumb screws 50 are provided on brackets 46—46 in order to lock the brackets in various positions of adjustment on the bars 44. Additionally, these bars may be curved and extended up to the left as shown in Figure 8. This permits the ladders to be tipped to a greater extent. Furthermore, by elongating such curved bars 44—44, the ladders may be tipped to an extent that they may be used as a boom, extending far out to one side of the truck. This type of mount is especially useful in electrical work in rural areas in situations in which the poles carrying wires are on the far side of a ditch.

It may be seen therefore that the invention provides a mount which can be operated easily and safely by one man. Furthermore, the angulation of the ladders may be adjusted within wide limits relative to the truck and, of course, the truck can be shifted in position to further extend the utility of the assembly. And, since the assembly is adapted to be manufactured and sold at a low cost it makes it possible for a contractor working by himself to do jobs which would not otherwise be possible unless he were to go to the expense of purchasing an aerial ladder truck which would have no other utility. In the present instance, the assembly may be mounted upon a wide variety of utility trucks and the installation does not interfere in any way with the primary use of the vehicle.

Having described my invention I claim:

1. Means to mount extension ladders upon the body of a vehicle to convert said vehicle to an aerial ladder vehicle, said means comprising a pair of rails each of which is substantially in the shape of an inverted U providing a horizontal run and two vertical runs at the opposite ends of the horizontal run, means to mount the two rails in spaced parallel relation straddlewise of a vehicle body, a carriage mounted on the rails for movement along the horizontal run and along substantially the full length of each vertical run, a ladder rack, and turntable means attaching the ladder rack to said carriage to permit the ladder rack to be swivelled on the carriage such that ladders in the rack may be swung from a position lengthwise of the vehicle while the carriage is on the horizontal run of the rails and then to an elevated position by moving the carriage from the horizontal run to a vertical run.

2. Means to mount extension ladders upon a vehicle to convert said vehicle to an aerial ladder truck, said means comprising a pair of rails each of which is configurated to provide a horizontal run and at least one vertical run, means to mount the rails in spaced parallel relation on top of said vehicle with the horizontal run transversely of the vehicle and the vertical run depending at one side thereof, a carriage mounted on the rails for movement along said horizontal run and along substantially the full length of said vertical run, a ladder rack, and pivotal means attaching the ladder rack to said carriage to permit the ladder rack to be swivelled on the carriage such that ladders in the rack may be swung from a position lengthwise of the vehicle while the carriage is on the horizontal run of the rails and then to an elevated position by moving the carriage from the horizontal run to the vertical run.

3. Means to mount extension ladders upon a vehicle body to convert said vehicle to an aerial ladder truck, said means comprising a ladder rack adapted to receive said extension ladders, a carriage, turntable means mounting the rack upon the carriage for rotation thereupon, track means, said track means being in the shape of an inverted U to provide two vertical runs and a horizontal run, means for mounting said track means straddlewise of a vehicle body in spaced parallel relation, and means mounting the carriage on the track means for movement along the horizontal run and along substantially the full length of the vertical runs thereof.

4. Means to mount extension ladders upon a vehicle body to convert said vehicle to an aerial ladder truck, said means comprising a ladder rack adapted to receive said extension ladders, a carriage, turntable means mounting the rack upon the carriage for rotation thereupon, a pair of tracks, each of said tracks configurated to provide at least one vertical run and a horizontal run, means for mounting said tracks on top of a vehicle body in spaced parallel relation, and means mounting the carriage on the tracks for movement along the horizontal run and along substantially the full length of the vertical run thereof.

5. Means to mount a pair of extension ladders upon a truck for converting the truck into an aerial ladder truck, said means comprising a pair of rails, each rail of the pair being in the shape of an inverted U to provide two vertical runs joined by a horizontal run, means to mount said rails straddlewise of said truck in spaced parallel relation, a carriage slidably mounted upon said rails for movement along the horizontal run and along substantially the full lengths of the vertical runs thereof, a ladder rack to receive said pair of extension ladders, means rotatably mounting said rack upon said carriage, means to lock said carriage in a centered position on the horizontal runs of said rails, and means to lock the ladder rack relative to the carriage.

6. Means to mount a pair of extension ladders upon a truck body to convert the truck into an aerial ladder truck, said means comprising a pair of tracks, each track comprising a channel which is substantially in the shape of an inverted U to provide a horizontal run and a pair of vertical runs and disposed with the open face of the channel at a side of the U, means for mounting the pair of tracks straddlewise on a truck body in spaced parallel relation with the open faces of the channels facing toward one another, a carriage carrying rollers, said rollers engaged in the channels of the tracks to permit the carriage to be rolled along the horizontal run and along substantially the full length of the vertical runs of the tracks, a ladder rack adapted to receive said extension ladders, and turntable means pivotally mounting said ladder rack upon the carriage for rotational movement with respect thereto, whereby ladders in the rack may be elevated by swinging the carriage so that the ladders are crosswise of the truck body and then moving the carriage onto a vertical run of the tracks at a side of said vehicle body.

7. Means to mount a pair of extension ladders as set forth in claim 6 in which means are provided to lock the turntable means with respect to the carriage in a position such that the turntable is oriented with the ladders disposed longitudinally of the truck body.

8. Means to mount a pair of extension ladders as set forth in claim 6 in which means are provided to lock the carriage at the center of the horizontal run.

References Cited in the file of this patent

UNITED STATES PATENTS

| | | |
|---|---|---|
| 303,520 | Johnson | Aug. 12, 1884 |
| 1,882,628 | Hirschman | Oct. 11, 1932 |
| 2,085,921 | McElheny | July 6, 1937 |
| 2,237,853 | Troche | Apr. 8, 1941 |
| 2,551,351 | Swenson | May 1, 1951 |
| 2,569,254 | Page | Sept. 25, 1951 |
| 2,715,974 | Van Nest | Aug. 23, 1955 |
| 2,746,628 | Neyra | May 22, 1956 |
| 2,834,491 | Wells | May 13, 1958 |
| 2,840,290 | Roberts | June 24, 1958 |